April 22, 1941.  C. L. STRAETEN  2,239,665
SLICING MACHINE CONVEYER
Filed June 5, 1939 2 Sheets-Sheet 1

Charles L. Straeten
INVENTOR

ATTEST-
BY
ATTORNEY

April 22, 1941.   C. L. STRAETEN   2,239,665
SLICING MACHINE CONVEYER
Filed June 5, 1939   2 Sheets-Sheet 2
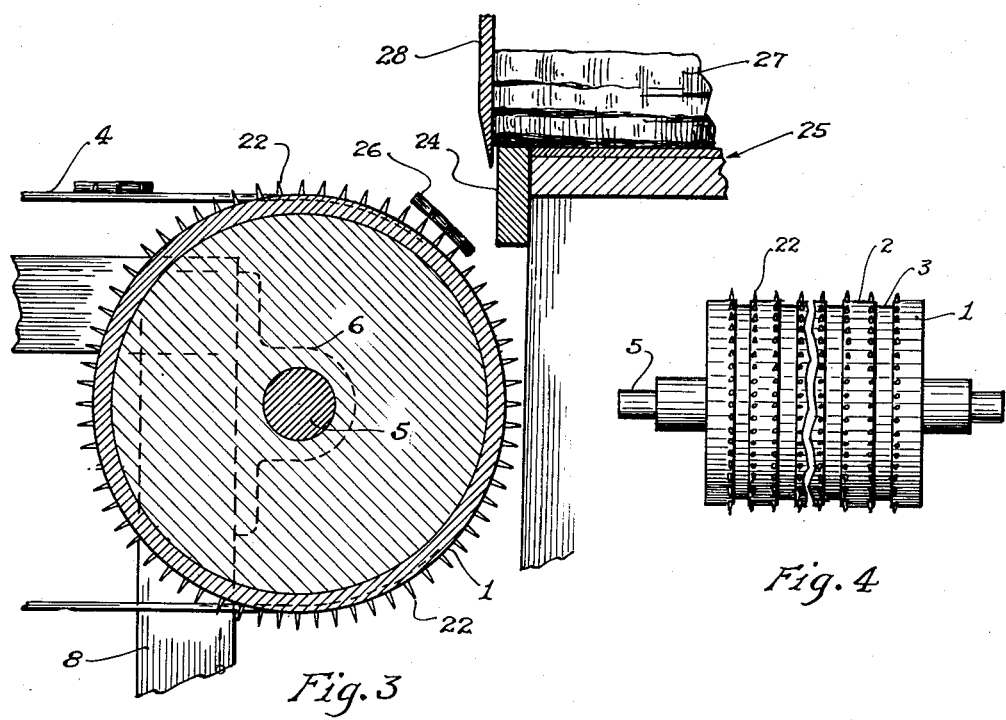
Fig. 3
Fig. 4
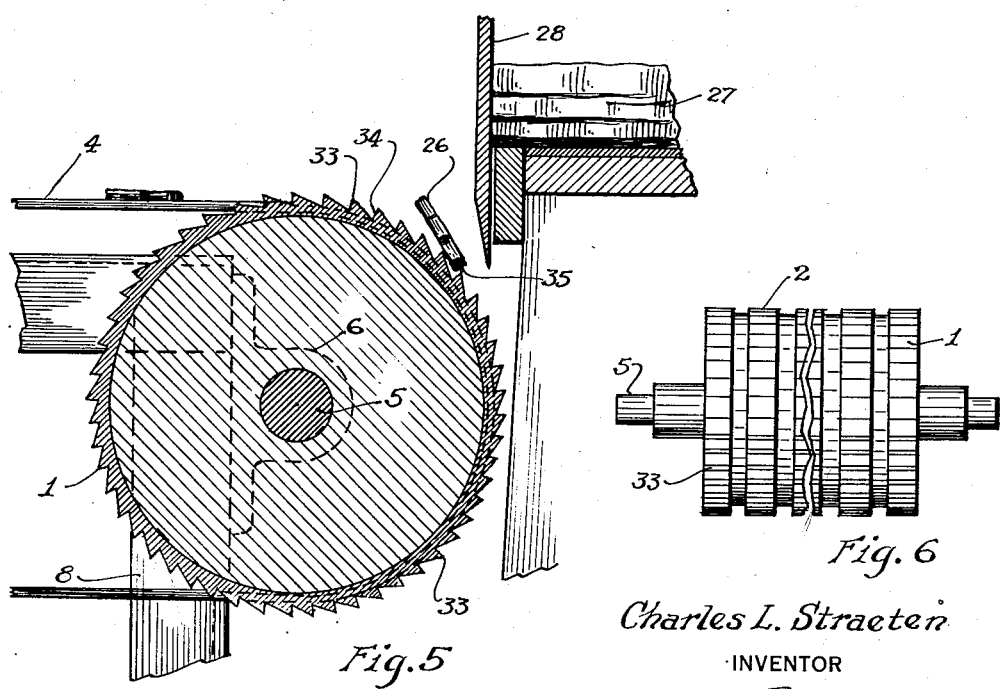
Fig. 5
Fig. 6
Charles L. Straeten
INVENTOR
ATTORNEY Patented Apr. 22, 1941

2,239,665

UNITED STATES PATENT OFFICE 2,239,665

SLICING MACHINE CONVEYER

Charles L. Straeten, Chicago, Ill., assignor to Industrial Patents Corporation, Chicago, Ill., a corporation of Delaware Application June 5, 1939, Serial No. 277,520

7 Claims. (Cl. 146—94)

This invention relates to an improved spacing and conveying means.

One of the objects of the invention is to provide an improved spacing and conveying means.

Another object of the invention is to provide an improved spacing means comprising a roller provided with radial protuberances.

Another object of the invention is to provide an improved spacing and conveying means comprising conveyer strands and a roller mounting the conveying strands provided with radial receiving and holding means.

Other objects of the invention will be apparent from the description and claims which follow.

In accordance with the present invention there is employed a roller, a conveying means travelling over the roller, the roller being provided with radial protuberances for receiving, for example, cut meat slices from a slicing machine and for spacing the meat slices on the conveying means.

In the drawings like characters of reference are used to designate similar elements.

Figure 3 is an enlarged sectional view through the device shown in Figure 1.

Figure 4 is a plan view, partly broken away, of the roller shown in Figure 3.

Figure 5 is an enlarged sectional view through a modified form of the device shown in Figure 1.

Figure 6 is a plan view, partly broken away, of the roller shown in Figure 5.

Figure 1:
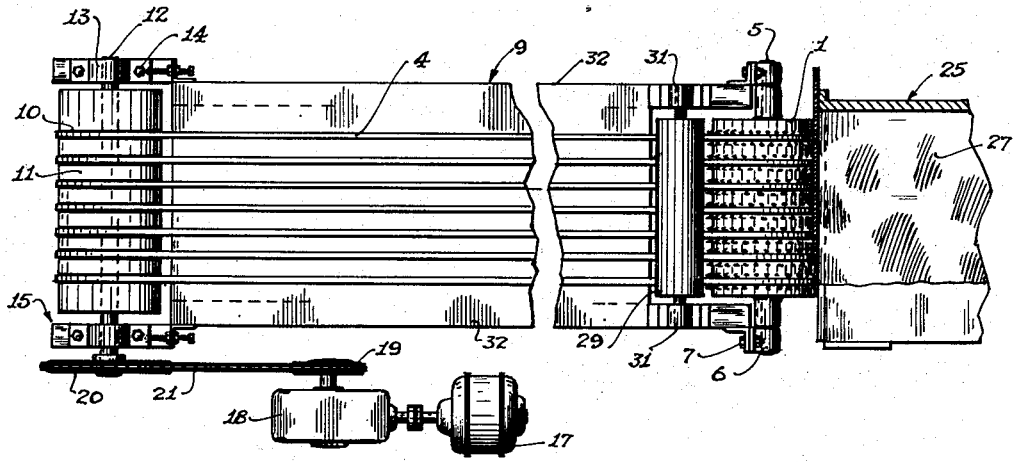
Figure 1 is a plan view showing one form of the roller constructed in accordance with the present invention, mounted relative to a slicing machine, part of which is broken away.
Figure 2:
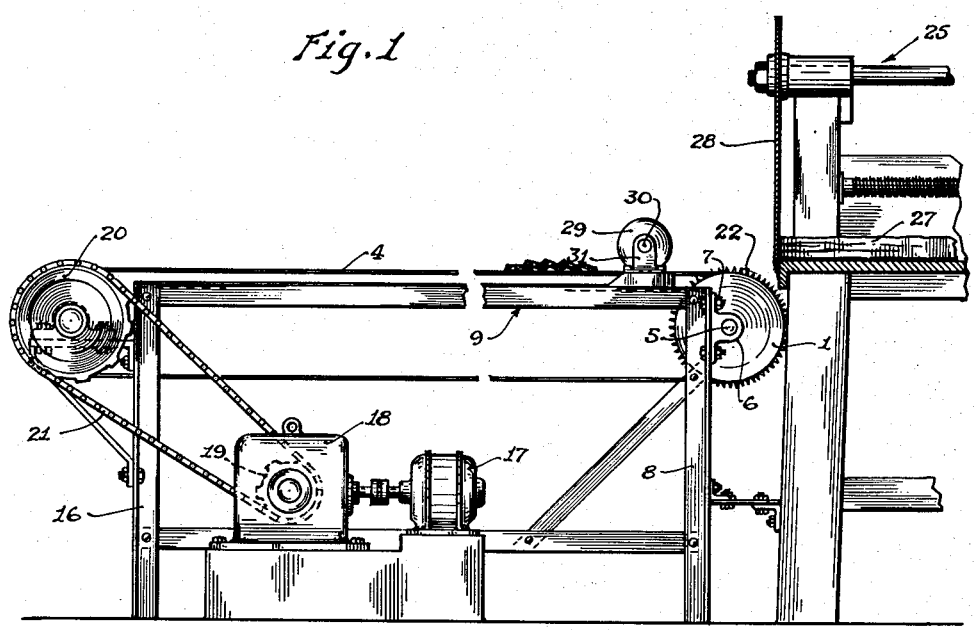
Figure 2 is a side view of Figure 1.

Reference is had to Figures 1 to 4, inclusive, in which is shown roller 1 provided with a series of spaced peripheral flanges 2 providing intermediate grooves 3 in which is mounted conveyer strands 4. Roller 1 is pinioned or otherwise rigidly secured to shaft 5 journaled within suitable bearings 6 rigidly secured as by bolts 7 to standards 8 of framework 9.

Conveyer strands 4 at their opposite ends travel through correspondingly arranged grooves 10 provided in the peripheral surface of driven roller 11. Roller 11 is pinioned or otherwise rigidly secured to shaft 12 which is journaled within suitable bearings 13 adjustably mounted as by bolts 14 upon take-up brackets 15, the brackets in turn being rigidly secured to standards 16 of framework 9. Shaft 12 is driven by power transmitted from motor 17 through the medium of gear box 18, sprockets 19 and 20, and chain 21.

As shown in detail in Figures 3 and 4, each of the flanges 2 of roller 1 is provided at one or both of its peripheral edges with a series of radial receiving and holding protuberances, such as, for example, radial pins 22.

As viewed in Figure 3, roller 1 is rotated in a counterclockwise direction and is mounted upon a horizontal axis below and to the forward side of shear plate 24 of slicing machine 25 to receive, for example, each bacon slice 26 as delivered from bacon slab 27 by cutter 28. Bacon slices 26 in their fall against pins 22 are secured by pins 22 in straight, flat condition and thereafter are stripped from pins 22 by rotation of roller 1 against conveyer strands 4.

It will be seen that by regulation of the speed of rotation of roller 1 relative to the cutting action of cutter 28, bacon slices 26 may be delivered to conveyer strands 4 with any desired spacing.

By rapidly rotating roller 1 relative to the cutting action of cutter 28, bacon slices 26 may be successively spaced one relative to the other on conveyer strands 4. On the other hand, it will be seen that by decreasing the speed of rotation of roller 1 relative to cutter 28, bacon slices 26 may be delivered to conveyer strands 4 in overlapped relationship in the manner shown in Figure 2.

It further will be seen that should it be desired to space bacon slices 26 onto conveyer strands 4 in groups of slices of a predetermined number in overlapping relationship, this may be accomplished by periodically interrupting the feed of bacon slab 27 to cutter 28. Devices for accomplishing this latter feature are well known in the art.

Bacon slices 26, following their delivery to conveyer strands 4 in overlapped relationship, are pressed one against the other by roller 29. Roller 29 is mounted upon shaft 30, which in turn is journaled in keepers 31 rigidly secured to cross members 32 of framework 9.

In the modified form of the device shown in Figures 5 and 6, the radial flanges 2 of roller 1 are provided with correspondingly circumferentially arranged teeth 33, each tooth 33 and consequently the aggregate of each series of teeth 33 extending longitudinally of the roller surface providing a radial receiving wall 34 facing in the direction of rotation of roller 1 for receiving the side edge 35 of bacon slices 26.

I claim:

1. In combination with a slicing machine having a shear plate and a cutter, a slice spacing and receiving conveyer comprising spaced conveyer strands and a roller provided with spaced peripheral flanges providing peripheral grooves mounting the conveyer strands, each of the flanges being provided with radially extended slice receiving pins, the roller being mounted below and to the forward side of the shear plate.

2. In combination with a slicing machine having a shear plate and a cutter, a slice spacing and receiving conveyer comprising spaced conveyer strands and a roller provided with spaced peripheral flanges providing intermediate peripheral grooves mounting the conveyer strands, each of the flanges being provided with correspondingly circumferentially arranged teeth, each series of teeth extending longitudinally of the roller providing a radial slice receiving wall facing in the direction of rotation of the roller, the roller being mounted below and to the forward side of the shear plate.

3. In combination with a slicing machine having a shear plate and a cutter, a slice spacing and receiving conveyer comprising spaced conveyer strands and a roller provided with spaced peripheral flanges providing peripheral grooves mounting the conveyer strands, each of the flanges being provided with radially extended slice receiving and holding means extending beyond the surface of the conveyer strands during travel of the conveyer strands over the roller, the roller being mounted below and to the forward side of the shear plate.

4. In combination with a slicing machine having a shear plate and a cutter, a slice spacing and receiving conveyer comprising spaced conveyer strands and a roller mounting the conveyer strands, the roller intermediate the spaced conveyer strands being provided with radial slice receiving and holding means extended beyond the surfaces of the conveyer strands, the roller being mounted below and to the forward side of the shear plate.

5. In combination with a slicing machine having a shear plate and a cutter, a slice spacing and receiving conveyer comprising spaced conveyer strands and a roller mounting the conveyer strands, the roller intermediate the spaced conveyer strands being provided with radial slice receiving pins extended beyond the surfaces of the conveyer strands, the roller being mounted below and to the forward side of the shear plate.

6. In combination with a slicing machine having a shear plate and a cutter, a slice spacing and receiving conveyer comprising spaced conveyer strands and a roller mounting the conveyer strands, the roller intermediate the spaced conveyer strands being provided with correspondingly circumferentially arranged teeth, each series of teeth extending longitudinally of the roller providing a unitary, radial slice receiving wall extended beyond the surfaces of the conveyer strands and facing in the direction of rotation of the roller, the roller being mounted below and to the forward side of the shear plate.

7. In combination with a slicing machine having a shear plate and a cutter, a slice spacing and receiving means comprising an endless conveyer means and a roller mounting the conveyer means, the roller being provided with radially extended slice receiving and holding means extending beyond the surface of the conveyer means and distributed transversely of the conveyer means during travel of the conveyer means over the roller, the roller being mounted below and to the forward side of the shear plate.

CHARLES L. STRAETEN.